Nov. 13, 1962     J. R. SMITH     3,063,410
WELDING JIG

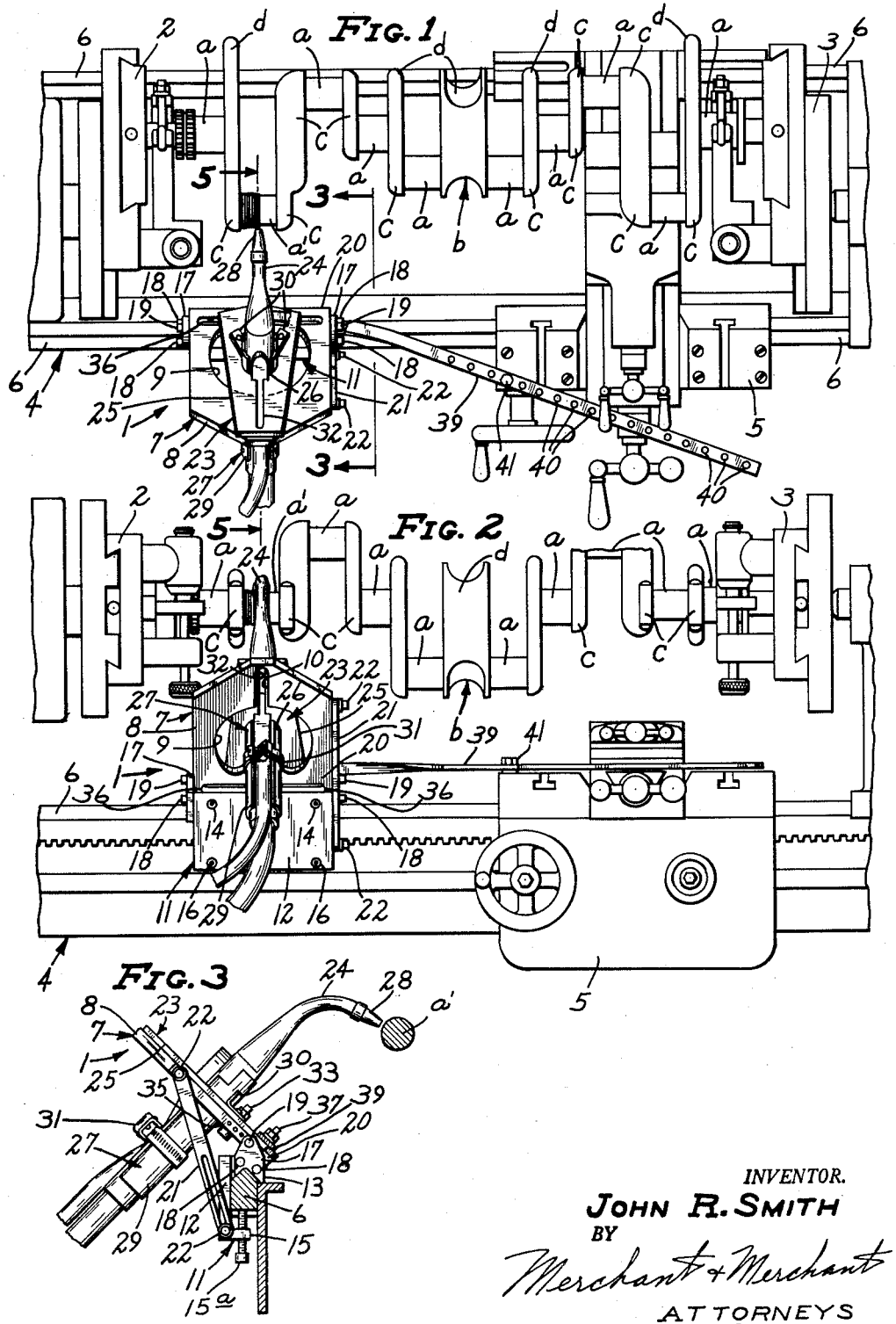

Filed Dec. 22, 1960     2 Sheets-Sheet 2

INVENTOR.
JOHN R. SMITH
BY
Merchant & Merchant
ATTORNEYS

United States Patent Office 3,063,410
Patented Nov. 13, 1962

3,063,410
WELDING JIG
John R. Smith, Minneapolis, Minn., assignor to Gopher Motor Rebuilding, Inc., Minneapolis, Minn., a corporation of Minnesota
Filed Dec. 22, 1960, Ser. No. 77,572
6 Claims. (Cl. 118—503)

This invention relates generally to welding apparatus and equipment, and more particularly it relates to a torch mounting welding jig for use in rebuilding the journals of a crankshaft.

It has been common in the art to resurface the journal of the crankshaft of internal combustion engines when the same became badly worn; however, previously known methods for resurfacing and rebuilding the journals of crankshafts have not producted optimum satisfaction. Of course, one previously known method or rebuilding the journals of crankshafts has been to center the crankshaft between the headstock and tailstock of a lathe, and thereafter build up a layer of metal on the journal surface by welding a coil of rod about the worn crankshaft journal. However, this method has also not been satisfactory because of the presence of obstructing portions of the crankshaft, such as the crank arms and counterweights, which prevent the desirable coalescence of the weld metal at the extreme ends of the journal where the same is connected to the above noted obstructing portions.

In light of the above noted problems, an important object of this invention is the provision of a torch mount-welding jig for use in rebuilding the journals of a crankshaft which is designed and constructed so that a continuous welding bead may be applied to the entire surface of the worn crakshaft journal, including the normally obstructed corner portion where the crakshaft journal is conected to the crank arm of the crankshaft. It might be noted that although the foregoing problems are exellently illustrated by the use of my invention for rebuilding the journals of the crankshafts of internal combustion engines, said problems are not so limited in occurrence. Thus, the above introduction is not intended to restrict the solutions which the present invention affords to the application of the same to other types of welding situations or even to other type of crankshaft rebuilding situations, inasmuch as many other similar problems may be affected and cared for by the application of this invention.

Another important object of this invention is the provision of a torch mounting welding jig for use in rebuilding the journals of a crakshaft which is designed and constructed for compound oscillatory movements and reciprocatory movements of the welding torch so that the same may be directed at an angle directly into the "corners" between the crankshaft journal and the adjacent crank arms of the crankshaft.

A still further object of my invention is the provision of a torch mounting welding jig for use in rebuilding the journals of a crankshaft which is so designed and constructed so as to move the tip of a welding torch carried thereby generally across, but spaced laterally from, the surface of a revolving crankshaft journal in a direction generally parallel to the axis of said journal, and still maintain the same spacing between the tip of the welding torch and the surface of said journal throughout the traverse of said journal by said welding torch.

Another object of this invention is the provision of a torch mounting welding jig for use in rebuilding the journals of the crankshaft which is adapted to be suitably mounted on the bed of a lathe.

Still another object of this invention is the provision of a torch mounting welding jig for use in rebuilding the journals of a crankshaft which is provided with connecting means intermediate the welding jig and the carriage of the lathe so as to impart the above described oscillatory and reciprocatory movements to this invention.

Still further objects of this invention reside in the provision of a torch mounting welding jig for use in rebuilding the journals of the crankshaft which is durable and strong in construction, relatively economical to manufacture, and highly efficient in the vindication of its purposes.

The foregoing and other objects and advantages of this invention will become apparent from the following detailed specification, appended claims, and attached drawings.

Referring to the drawings wherein like reference characters indicate like parts or elements throughout the several views:

FIG. 1 is a view in top plan showing my invention mounted on a carriage equipped lathe as it is used in rebuilding the journals of a crankshaft mounted for rotation intermediate the headstock and tailstock of the lathe;

FIG. 2 is a view in front elevation of my invention and the lathe and cranksaft shown in FIG. 1;

FIG. 3 is an enlarged view in vertical section taken on the line 3—3 of FIG. 1;

Figure 4:
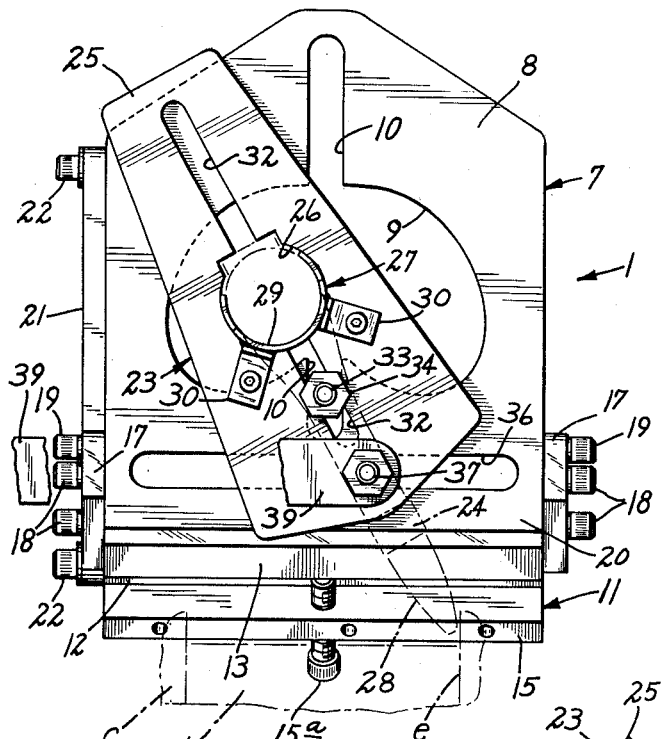
FIG. 4 is a further enlarged plan view of my invention, a portion of the crankshaft and the welding torch shown in FIGS. 1-3 being represented in this figure by broken lines.

Referring to the drawings, and particularly FIGS. 1 and 2 thereof, the welding jig which comprises the present invention is represented generally by the reference numeral 1. The welding jig 1 is shown in FIGS. 1 and 2 in its operative position as used in rebuilding the journal $a$ of a crankshaft $b$. The crank arms and counterweights of the crankshaft $b$ are represented by the reference characters $c$ and $d$ respectively. The crankshaft $b$ as shown in FIGS 1 and 2 is centered for rotation intermediate the headstock 2 and the tailstock 3 of a lathe 4. The lathe 4 is provided with a longitudinally driven tool carriage 5 which is carried by a pair of lathe bed defining rails 6. It is noted that the headstock 2 and the tailstock 3 of the lathe 4 are of the type commonly used in centering crankshafts, and are laterally adjustable so that any given one of the crankshaft journals $a$ may be centered for rotation about its own axis.

In accordance with my invention, the welding jig 1 comprises a base member, represented generally by the reference numeral 7, which is longitudinally adjustably secured to one of the rails 6 of the lathe bed in laterally spaced generally upstanding relation to the journal $a$ of the crankshaft $b$ which is to be rebuilt. The base member 7 comprises a generally flat base plate 8 which is preferably, and as shown, disposed in an upwardly and outwardly inclined position with respect to the axis of the journal $a'$, and which defines a generally centrally disposed inverted heart-shaped aperture 9 and a generally vertically extended guideway 10. The base plate 8 is rigidly secured to the rail 6 of the lathe bed by means of a mounting bracket, represented generally by the reference numeral 11, for longitudinal adjustment with respect to the lathe bed and the crankshaft $b$ whereby the welding jig 1 may be positioned in laterally spaced relation to any given one of the journals $a$ to be rebuilt. The mounting bracket 11 is constructed to act as a clamp for securing the welding jig 1 to the lathe bed, and the mounting bracket 11 comprises a back plate 12, an upper jaw member 13 rigidly secured to the back plate 12 by means of the cap screws 14, a lower jaw member 15 rigidly secured to the back plate 12 by means of the cap screws 16, and a set screw 15a. The mounting bracket 11 further comprises a pair of upstanding lugs 17 which are rigidly secured by means of the cap screws 18 to the opposite ends of the upper jaw member 13. The lugs 17 are so disposed for the purpose of supporting the base plate 8 by means of a pair of co-axially disposed cap screws 19 which are secured to the opposite sides of the lower portion 20 of the base plate 8 whereby to support said base plate 8 for pivotal swinging movements about the cap screws 19. For the purpose of providing adjustment means between the mounting bracket 11 and the base plate 8, and also for the purpose of establishing a rigid connection therebetween, an elongated and slotted adjustment bar 21 is disposed intermediate the base plate 8 and the mounting bracket 11 by means of cap screws 22 whereby the inclination of the welding jig 1 may be easily varied.

According to present practices, the welding jig 1 further comprises a supporting member 23 which is adapted to receive and support a welding torch 24 in a welding position with respect to the journal a' which is to be rebuilt. Although the particular type of welding torch 24 used with my welding jig 1 is not a specific part of this invention, the torch 24 disclosed in connection therewith is of the welding rod enclosing type wherein the welding rod is continuously fed through the torch 24 to be welded to the workpiece by the tip 28 of the torch 24. The supporting member 23 comprises a generally flat swing plate 25 which is disposed in face-to-face relationship with the above described base plate 8 of the base member 7. A preferred configuration of the swing plate 25 is particularly shown in FIG. 4. The swing plate 25 is formed to define a generally centrally disposed aperture 26 for receiving the welding torch 24. The supporting member 23 further comprises a torch bracket 27 for adjustably mounting the torch 24 within the aperture 26 of the swing plate 25 so that the tip 28 of the torch 24 may be suitably positioned for welding on the surface of the journal a' which is to be rebuilt. The torch bracket 27 comprises an elongated pipe section 29 which is provided with ears 30 for rigidly securing the bracket 27 to the swing plate 25 by suitable fasteners, as seen particularly in FIG. 4. The welding torch 24 may then be conveniently and securely clamped within the pipe section 29 of the torch bracket 27 by means of a conventional pipe clamp 31, as seen particularly in FIGS. 2 and 3, the welding torch 24 of course being axially adjustable within the pipe section so that the tip 28 of the torch 24 may be easily adjusted with respect to the crankshaft journal a'. The swing plate 25 also defines a guide slot 32 which extends in opposite diametric directions with respect to the aperture 26. The purpose and function of the guide slot 32 will be specifically set forth hereinafter.

Figure 5:
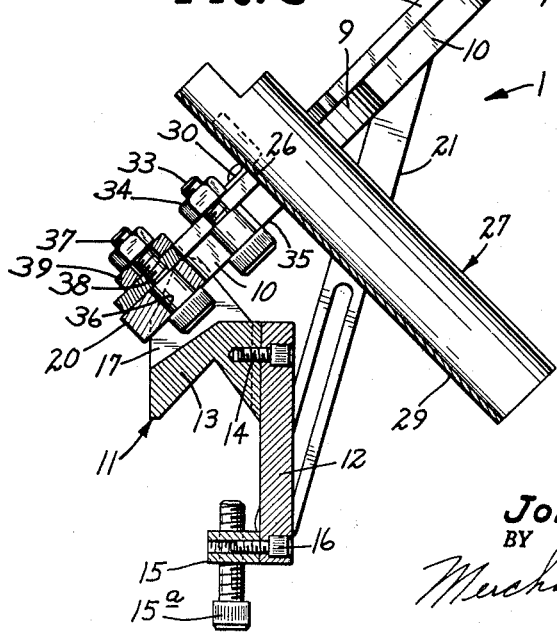
FIG. 5 is an enlarged view in vertical section taken on the line 5—5 of FIG. 1, but not showing the welding torch shown in FIG. 1.

Referring particularly to FIG. 4, the welding torch 24 and the crankshaft journal a' are illustrated therein by broken lines, and it will be noted that the angular position of the torch tip 28 is necessary in order to permit satisfactory welding of the portion of the crankshaft journal a' adjacent the shoulder e of the crank arm c; however, in order to maintain an exact spacing between the tip 28 of the welding torch 24 and the surface of the journal a' throughout the swing of the welding tip 28 from one side of the journal a' to the other side thereof, it is necessary that means be provided for mounting the swing plate 25 on the base plate 8 for compound oscillatory movements and reciprocatory movements radially of the axis of the oscillatory movements. Such means for permitting said compound movement comprises a guide pin or shoulder bolt 33 adjustably secured within the guide slot 32 defined by the swing plate 25, as shown particularly in FIGS. 4 and 5. Preferably, and as shown, the shoulder bolt 33 is provided with a nut 34 at one end thereof for rigidly but adjustably securing the same to the swing plate 25, but the other end of the shoulder bolt 33 is provided with a head which abuts against the lower face 35 of the base plate 8 so as to hold the base plate 8 and the swing plate 25 in face-to-face slidable relationship with one another. It is noted that the intermediate portion of the shoulder bolt 33 acts as a guide pin for reciprocating movements within the guideway 10 of the base plate 8 so as to define the axis of the above-described oscillatory movements and also to define the above-described reciprocatory movements of the swing plate 25 with respect to the base plate 8. As used herein, it should be understood that the term oscillatory movement refers to the generally pendulum-like swinging of the torch-carrying swing plate 25 about the axis of the shoulder bolt 33, whereas the term reciprocatory movement refers to the back and forth movement of the swing plate 25 in a generally vertical direction with respect to the slot 10 of the base plate 8.

For the purpose of controlling or defining the limits of the reciprocatory movements of the swing plate 25 during the compound movements thereof, guide means is preferably provided. Said guide means also defines the general direction of the oscillatory movement of the swing plate 25, and the torch 24 carried thereby, whereby to produce limited longitudinal movements of the torch 24 with respect to the axis of the journal a' in a direction laterally spaced from and generally parallel to the axis of said journal a'. In accordance with my invention, a second guide slot 36 is defined in the lower portion 20 of the base plate 8, the second guide slot 36 being elongated in a direction generally parallel with the axis of the journal a' which is to be rebuilt and also generally normal to the guideway 10 defined by the base plate 8. As seen particularly in FIG. 5, a follower pin such as a shoulder bolt 37 is rigidly secured, as at 38, to the lower portion of the swing plate 25. The shoulder bolt 37 also projects into the second guide slot 36 so as to comprise the above-described control of said reciprocatory movement.

The above-described compound movement of the swing plate 25 and the torch 24 carried thereby is imparted thereto by means of an elongated connecting bar 39, which is pivotally secured at one end thereof to the lower portion of the swing plate 25 by means of the shoulder bolt 37, and which is pivotally secured, as at 41, at the other end thereof to the carriage 5 of lathe 4. It is noted that the connecting bar 39 is provided with a plurality of longitudinally spaced apertures 40 so that an adjustment may be made between the connecting bar 39 and the tool carriage 5 when my welding jig 1 is disposed in different longitudinally spaced positions on the bed of the lathe 4. Of course, it is the normal longitudinal movement of the power driven tool carirage 5 transferred by means of the connecting bar 39 to the swing plate 25, which imparts the above described oscillatory movement to the swing plate 25, the reciprocatory movement thereof being controlled by means of the second guide slot 36, the shoulder bolt 37, the shoulder bolt 33 and the guideway 10. It should be noted that it is the adjusted position of the shoulder bolt 33 within the guide slot 32 of the swing plate 25 which defines the amount of oscillatory movement of the swing plate 25.

Having specifically described my invention, the operative simplicity thereof will be hereinafter set forth in detail. After the crankshaft b has been properly centered intermediate the headstock 2 and the tailstock 3 of the lathe 4 for rotation of the journal a' which is to be rebuilt about its own axis, the welding torch 24 is properly located within its bracket 27 so that the tip 28 thereof is positioned in its properly spaced relationship with respect to the journal a' so as to insure that the desired welding characteristics will be obtained. See FIG. 3. It is noted that the position of the tip 28 of the welding torch 24 may be also adjusted with respect to the journal a' by use of the adjustment bar 21. Then the securement of the shoulder bolt 33 to the swing plate 25 is adjusted within the guide slot 32 so as to adjust the magnitude of the above-described limited longitudinal movements of the torch 24 carried by the swing plate 25 to correspond approximately to the length of the journal a'. Thereafter, the swing plate 25 and the welding torch 24 carried thereby are swung to one extreme side position thereof, as seen in FIG. 4, and the connecting bar 39 is adjusted with respect to the lathe carriage 5. Of course, the initial position of the torch 24 may be set by moving the carriage 5 if the connecting bar 39 has already been connected to the carriage 5. Then, when the longitudinal movement of the lathe carriage 5 is actuated, and the torch 24 is started in its weld producing operation, the torch 24 moves across the revolving surface of the journal a' so as to weld a continuous bead on the surface of the journal a', the spacing between the tip 28 of the torch 24 and the surface of the journal a' being maintained throughout the relative movement therebetween. See FIGS. 1 and 2. Although the weldings jig 1 is shown with the shoulder bolt 33 secured within the lower portion of the guide slot 32, and therefore the shoulder bolt 33 reciprocating within the lower portion of the guideway 10, it should be understood that the swing plate 25 may be secured to the base plate 8 with the shoulder bolt 33 secured within the upper portion of the guide slot 32, and the shoulder bolt 33 consequently reciprocating within the upper portion of the guideway 10, whereby to considerably increase the range of longitudinal movement of the swing plate 25 and the welding torch 24 carried thereby.

This invention has been thoroughly tested and found to be completely satisfactory for the accomplishment of the above objects; and while I have shown and described above a preferred embodiment thereof in which the principles of the present invention have been incorporated, I wish it to be specifically understood that the same may be modified without departure from the scope and spirit of the appended claims.

What I claim is:

1. A torch mounting welding jig for use in rebuilding the journals of a crankshaft which is centered for rotation intermediate the headstock and tailstock of a carriage equipped lathe; said jig comprising a base member adjustably secured to the bed of said lathe in laterally spaced relation to the journal of said crankshaft which is to be rebuilt; a supporting member adapted to receive and support a torch in welding position with respect to said journal; means mounting said supporting member on said base member for compound oscillatory movements and reciprocatory movements generally radially of the axis of the oscillatory movements; guide means for controlling the reciprocatory movements of said supporting member and for defining the general direction of the oscillatory movement of the supporting member whereby to permit limited longitudinal movements of the torch with respect to the axis of said journal in a direction laterally spaced from and generally parallel to the axis of said journal; and means for imparting said compound movements to said supporting member.

2. A torch mounting welding jig for use in rebuilding the journals of a crankshaft which is centered for rotation intermediate the headstock and tailstock of a carriage equipped lathe; said jig comprising a plate-like base member adjustably secured to the bed of said lathe in generally upstanding laterally spaced relation to the journal of said crank shaft which is to be rebuilt; a plate-like supporting member adapted to receive and support a torch in welding position with respect to said journal; means mounting said supporting member on said base member in face-to-face relationship therewith for compound oscillatory movements and reciprocatory movements generally radially of the axis of the oscillatory movements; guide means for controlling the reciprocatory movements of said supporting member and for defining the general direction of the oscillatory movement of the supporting member whereby to permit limited longitudinal movements of the torch with respect to the axis of said journal in a direction laterally spaced from and generally parallel to the axis of said journal; and means for imparting said compound movements to said supporting member.

3. A torch mounting welding jig for use in rebuilding the journals of a crankshaft which is centered for rotation intermediate the headstock and tailstock of a carriage equipped lathe; said jig comprising a base member adjustably secured to the bed of said lathe in laterally spaced generally upstanding relation to the journal of said crankshaft which is to be rebuilt; said base member comprising a generally flat base plate which defines a generally vertically extending guideway, and a mounting bracket for adjustably securing said base plate to the bed of said lathe; a supporting member adapted to receive and support a torch in welding position with respect to said journal; said supporting member comprising a generally flat swing plate disposed in face-to-face relation with said base plate, said swing plate defining a generally centrally disposed aperture for receiving said torch and also defining a diametrically extending guide slot, and bracket means for adjustably but rigidly securing said torch to said swing plate; means mounting said swing plate on said base plate for compound oscillatory movements and reciprocatory movements generally radially of the axis of the oscillatory movements; guide means for controlling the reciprocatory movements of said swing plate and for defining the general direction of the oscillatory movement of the supporting member whereby to permit limited longitudinal movements of the torch with respect to the axis of said journal in a direction laterally spaced from and generally parallel to the axis of said journal; and means for imparting said compound movements to said swing plate.

4. A torch mounting welding jig for use in rebuilding the journals of a crankshaft which is centered for rotation intermediate the headstock and tailstock of a carriage equipped lathe; said jig comprising a base member adjustably secured to the bed of said lathe in laterally spaced generally upstanding relation to the journal of said crankshaft which is to be rebuilt; said base member comprising a generally flat base plate which defines a generally vertically extending guideway, and a mounting bracket for adjustably securing said base plate to the bed of said lathe; a supporting member adapted to receive and support a torch in welding position with respect to said journal; said supporting member comprising a generally flat swing plate disposed in face-to-face relation with said base plate, said swing plate defining a generally centrally disposed aperture for receiving said torch and also defining a diametrically extending guide slot, and bracket means for adjustably but rigidly securing said torch to said swing plate; means mounting said swing plate on said base plate for compound oscillatory movements generally and reciprocatory movements radially of the axis of the oscillatory movements; said mounting means comprising a guide pin adjustably secured within the guide slot defined by said swing plate and disposed within the guideway defined by said base plate for reciprocatory movements therein, said reciprocating guide pin defining the axis of said oscillatory movements; guide means for controlling the reciprocatory movements of said swing plate and for defining the general direction of the oscillatory movement of the supporting member whereby to permit limited longitudinal movements of the torch with respect to the axis of said journal in a direction laterally spaced from and generally parallel to the axis of said journal; said guide means comprising an elongated second guide slot defined in the lower portion of said base plate, said second guide slot being elongated in a direction generally parallel with the axis of said journal and generally normal to said guideway defined by said base plate, and a follower pin rigidly secured to said swing plate and projecting into said second guide slot; and means for imparting said compound movements to said swing plate.

5. The structure defined in claim 4 in which said means for imparting said compound movements to said swing plate comprises an elongated connecting bar rigidly but adjustably secured intermediate the carriage of said lathe and said swing plate.

6. The structure defined in claim 4 in which said base plate is disposed in an upwardly and outwardly inclined position with respect to the axis of said journal; and in which said mounting jig is provided with an adjustment bar disposed intermediate said base plate and said mounting bracket for varying the inclination of said base plate.

References Cited in the file of this patent
UNITED STATES PATENTS

| | | |
|---|---|---|
| 1,947,493 | Rose et al. | Feb. 20, 1934 |
| 2,431,781 | Wagner | Dec. 2, 1947 |